(12) United States Patent
Wang et al.

(10) Patent No.: US 8,901,018 B2
(45) Date of Patent: Dec. 2, 2014

(54) COMPOSITE ENCAPSULATING MATERIAL

(71) Applicant: National Taipei University of Technology, Taipei (TW)

(72) Inventors: Sea-Fue Wang, Taipei (TW); Chieh-Sheng Cheng, Taipei (TW); Yung-Fu Hsu, New Taipei (TW)

(73) Assignee: National Taipei University of Technology, Taipei (TW)

( * ) Notice: Subject to any disclaimer, the term of this patent is extended or adjusted under 35 U.S.C. 154(b) by 19 days.

(21) Appl. No.: 13/749,482

(22) Filed: Jan. 24, 2013

(65) Prior Publication Data

US 2014/0106955 A1   Apr. 17, 2014

(30) Foreign Application Priority Data

Oct. 17, 2012  (TW) ............................. 101138199 A (51) Int. Cl.
*C03C 8/04* (2006.01)
*C03C 8/24* (2006.01)
*H01M 8/02* (2006.01)

(52) U.S. Cl.
CPC ............... *H01M 8/0282* (2013.01); *C03C 8/24* (2013.01); *Y02E 60/50* (2013.01)
USPC .................... 501/15; 501/17; 501/21; 501/26

(58) Field of Classification Search
CPC ................ C03C 8/04; C03C 8/14; C03C 8/24
USPC .......................................... 501/15, 17, 21, 26
See application file for complete search history.

(56) References Cited

U.S. PATENT DOCUMENTS 3,947,281 A * 3/1976 Bacon ............................. 501/38
2006/0019813 A1 * 1/2006 Yoshii ............................ 501/15

FOREIGN PATENT DOCUMENTS

JP            60145932   * 8/1995
JP          2005247602   * 9/2005

* cited by examiner

*Primary Examiner* — Karl Group
(74) *Attorney, Agent, or Firm* — Pai Patent & Trademark Law Firm; Chao-Chang David Pai (57) ABSTRACT

The present invention is a composite encapsulating material which consists of silicon dioxide, aluminum oxide, yttrium oxide and zinc oxide and has glass transition temperature between 694° C. and 833° C. as well as expansion coefficient between 7.0 and 8.5×10$^{-6}$/° C. The ratio of the number of moles of silicon dioxide plus aluminum oxide (yttrium oxide or zinc oxide) to the total number of moles is 41.88~62.22% (10.48~26.67% or 11.11~47.64%); the ratio of the number of moles of aluminum oxide to the total number of moles is 5.23~17.78%. The ratios of aluminum oxide to silicon dioxide, yttrium oxide to silicon dioxide, and zinc oxide to silicon dioxide are 0.14~0.40, 0.29~0.60, and 0.25~1.30, respectively.

7 Claims, 12 Drawing Sheets

COMPOSITE ENCAPSULATING MATERIAL

BACKGROUND OF THE INVENTION

1. Field of the Invention

The present invention relates to a composite encapsulating material, particularly a composite encapsulating material consisting of oxides.

2. Description of the Prior Art

In the fuel cell technology, Solid Oxide Fuel Cell (SOFC) has advantages such as high transfer efficiency, diversified fuel sources, and lower material cost. However, SOFC featuring high operating temperature (600° C.~800° C.) demands a high-temperature encapsulation technology which is based on fluid glass-based encapsulating materials to fill gaps between SOFC and a substrate and insulate fuel gas from oxygen for airtight joint. For a fluid encapsulating material, glass transition temperature should be adjusted in the range of 600° C.~800° C., operating temperature of SOFC.

In practice, materials used in SOFC are usually operated at high temperature. The materials experience cycles from to high temperature between normal startup and stop, so that some characteristics among different components such as matching attribute and heat stability are critical. Accordingly, an encapsulating material should be effective in a buffer action to reduce any stress-induced damage to one component out of expansion and contraction.

Shou-Guo Huang et al. disclosed Si—Al—Y—Ba—B glass in *Journal of Alloys and Compounds* wherein the ratios of various oxides are: silicon dioxide (3.53 wt %; 6.97 mol %), aluminum oxide (7.21 wt %; 8.39 mol %), yttrium oxide (10 wt %; 5.27 mol %), barium oxide (60 wt %; 46.55 mol %), and boron oxide (19.26 wt %; 32.83 mol %). As one material to encase connecting plates between components, this type of glass with boron and alkaline earth elements mixed may result in chemical compounds including cesium, magnesium, barium and calcium, which change an expansion coefficient and cause breaks between composite materials and connecting plates, as well as other chemical compounds on cathode of SOFC due to chemical reactions of alkaline earth elements deteriorating resistivity of SOFC operating at high temperature for a long time. On the other hand, heat stability of glass chronically used will be deteriorated in spite of lowered viscosity and increased wettability of boron oxide added glass due to addition of boron oxide which is characteristic of a low melting point and volatility but causes generation of boron hydroxide.

SUMMARY OF THE INVENTION

The object of the present invention is to provide a composite encapsulating material consisting of silicon dioxide, aluminum oxide, yttrium oxide and zinc oxide. The composite encapsulating material has glass transition temperature from 694° C. to 833° C. and an expansion coefficient between 7.0 and $8.5 \times 10^{-6}/°$ C.

The ratio of the number of moles of silicon dioxide plus aluminum oxide (yttrium oxide or zinc oxide) to the total number of moles is 41.88~62.22% (10.48~26.67% or 11.11~47.64%). Moreover, the ratio of the number of moles of aluminum oxide to the total number of moles is 5.23~17.78%.

Furthermore, the ratios of aluminum oxide to silicon dioxide, yttrium oxide to silicon dioxide, and zinc oxide to silicon dioxide are 0.14~0.40, 0.29~0.60 and 0.25~1.30, respectively.

The other object of the present invention is to provide a composite encapsulating material comprising the above composite encapsulating material and an extra glass additive, i.e., bismuth yttrium oxide ($Bi_{1.5}Y_{0.5}O_3$) wherein the weight ratio of the glass additive to the above composite encapsulating material is 1:1 and the expansion coefficient of the composite encapsulating material with the extra glass additive added is between $9 \times 10^{-6}/°$ C. and $11 \times 10^{-6}/°$ C.

It can be seen from the above descriptions that the present invention has advantages such as better air impermeability, lower softening temperature and easier compression than other encapsulating materials based on the prior art and does not use lead, boron or alkaline earth elements which result in loss of components and environmental pollution.

These features and advantages of the present invention will be fully understood and appreciated from the following detailed description of the accompanying Drawings.

DETAILED DESCRIPTION OF THE PREFERRED EMBODIMENT

Table 1 illustrates various ratios of compositions in the present invention of a composite encapsulating material.

TABLE 1

|  | SiO$_2$ | Al$_2$O$_3$ | Y$_2$O$_3$ | ZnO | Al$_2$O$_3$/SiO$_2$ | Y$_2$O$_3$/SiO$_2$ | ZnO/SiO$_2$ |
|---|---|---|---|---|---|---|---|
| YAS1-50 | 40.00 | 16.00 | 24.00 | 20.00 | 0.40 | 0.60 | 0.50 |
| YAS1-25 | 44.44 | 17.78 | 26.67 | 11.11 | 0.40 | 0.60 | 0.25 |
| YAS4-130 | 36.65 | 5.23 | 10.48 | 47.64 | 0.14 | 0.29 | 1.30 |
| YAS4-120 | 38.04 | 5.44 | 10.87 | 45.65 | 0.14 | 0.29 | 1.20 |
| YAS4-100 | 41.18 | 5.88 | 11.76 | 41.18 | 0.14 | 0.29 | 1.00 |
| YAS4-50 | 51.86 | 7.40 | 14.81 | 25.93 | 0.14 | 0.29 | 0.50 |
| YAS5-100 | 37.50 | 12.50 | 12.5 | 37.50 | 0.30 | 0.30 | 1.00 |
| YAS5-90 | 39.00 | 13.00 | 13.00 | 35.00 | 0.30 | 0.30 | 0.90 |
| YAS5-50 | 46.16 | 15.38 | 15.38 | 23.08 | 0.30 | 0.30 | 0.50 |

Figure 1A:
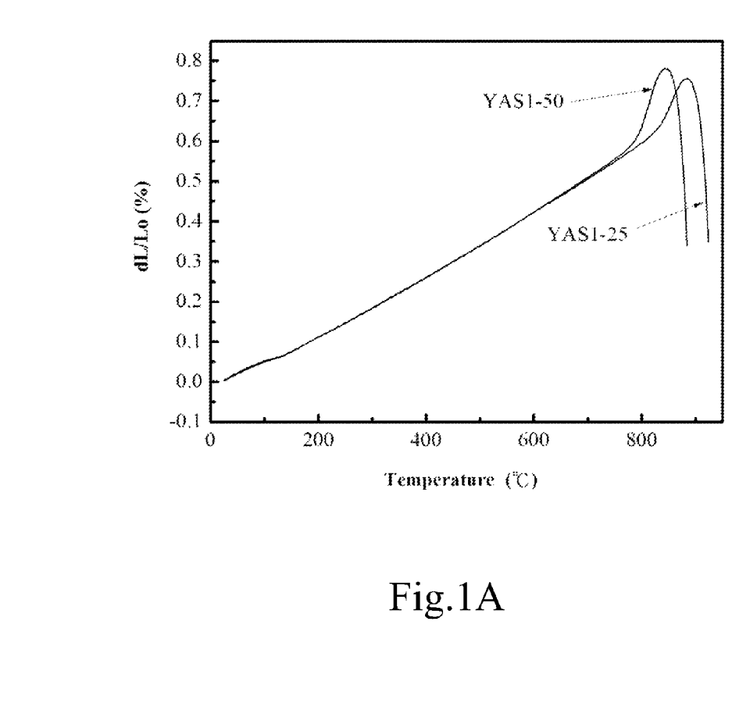
FIG. 1A illustrates curves of thermal expansion coefficients for YAS1-50 and YAS1-25 of the present invention.
Figure 1B:
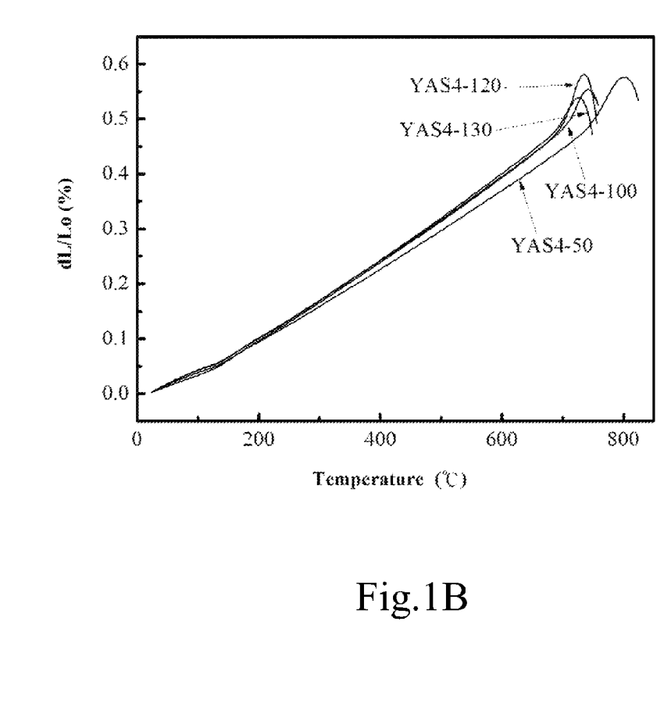
FIG. 1B illustrates curves of thermal expansion coefficients for YAS4-130, YAS4-120, YAS4-100 and YAS4-50 of the present invention.
Figure 1C:
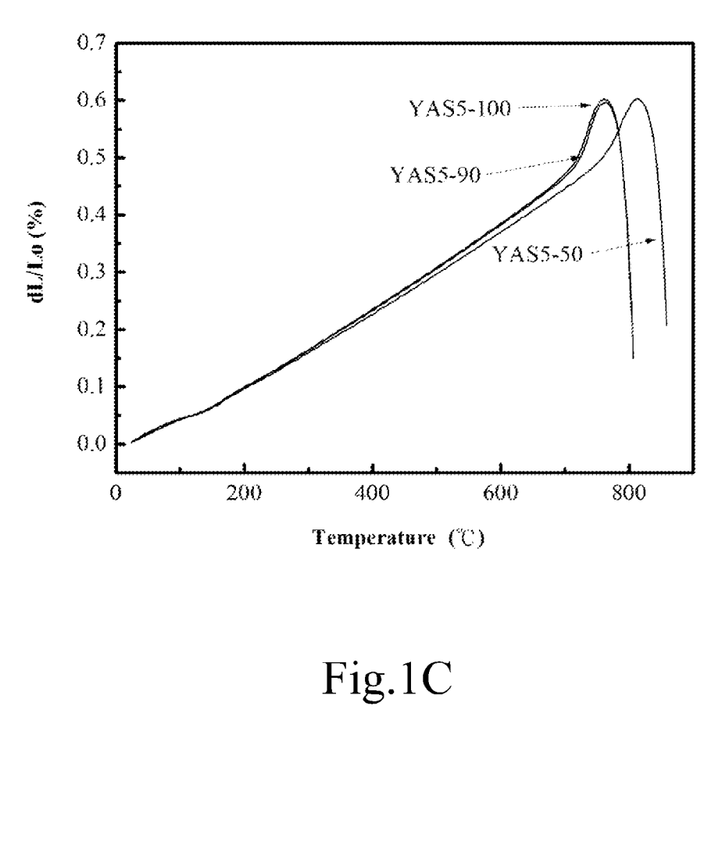
FIG. 1C illustrates curves of thermal expansion coefficients for YAS5-100, YAS5-90 and YAS5-50 of the present invention.
Figure 2A:
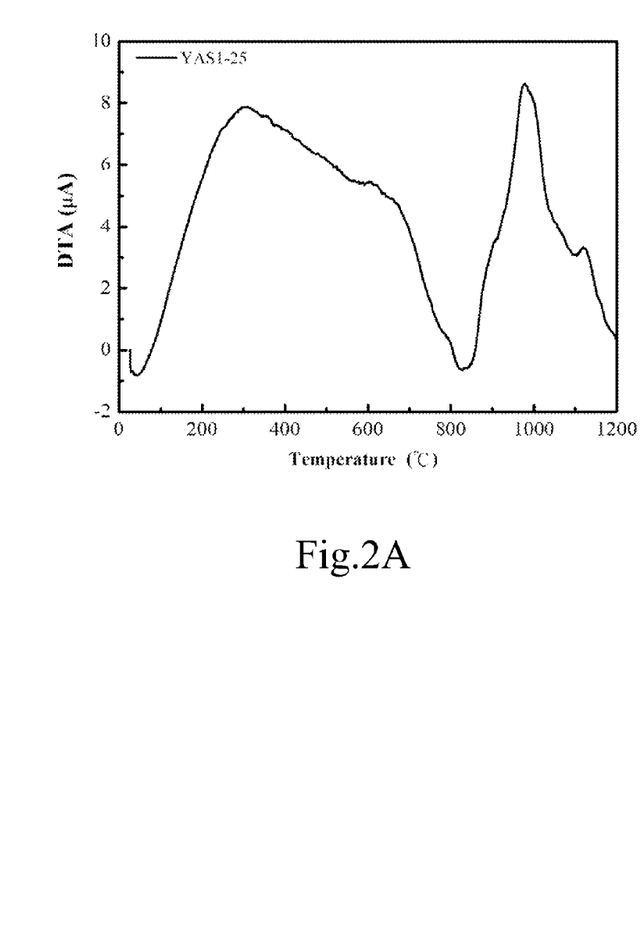
FIG. 2A illustrates the curve of differential thermal analysis of glass for YAS1-25 of the present invention.
Figure 2B:
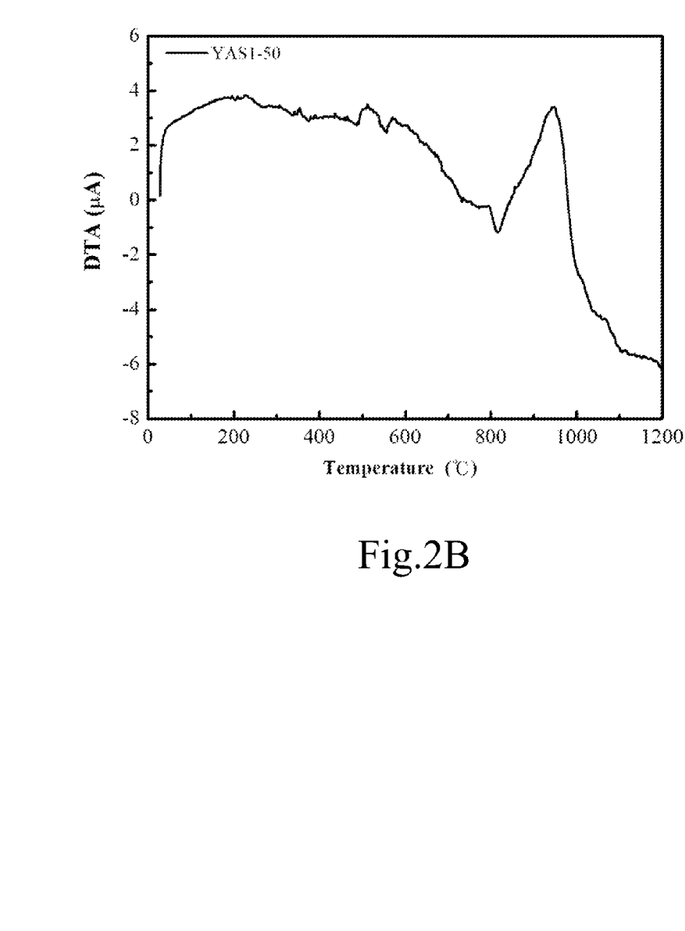
FIG. 2B illustrates the curve of differential thermal analysis of glass for YAS1-50 of the present invention.
Figure 2C:
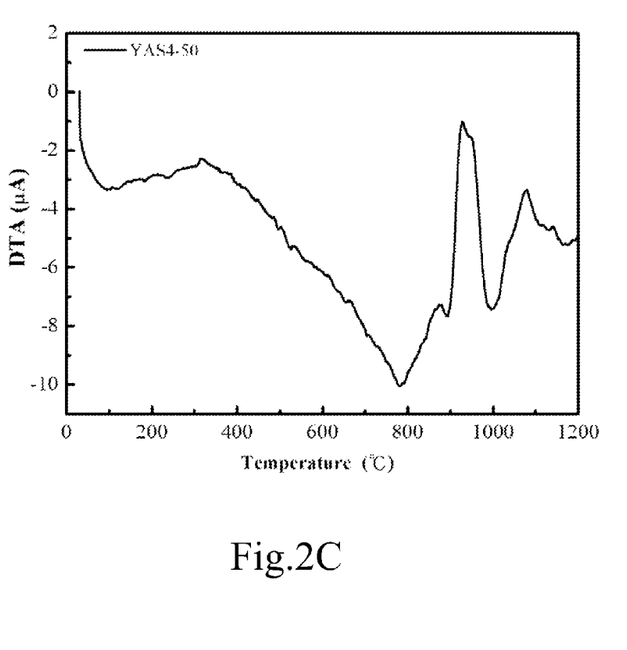
FIG. 2C illustrates the curve of differential thermal analysis of glass for YAS4-50 of the present invention.
Figure 2D:
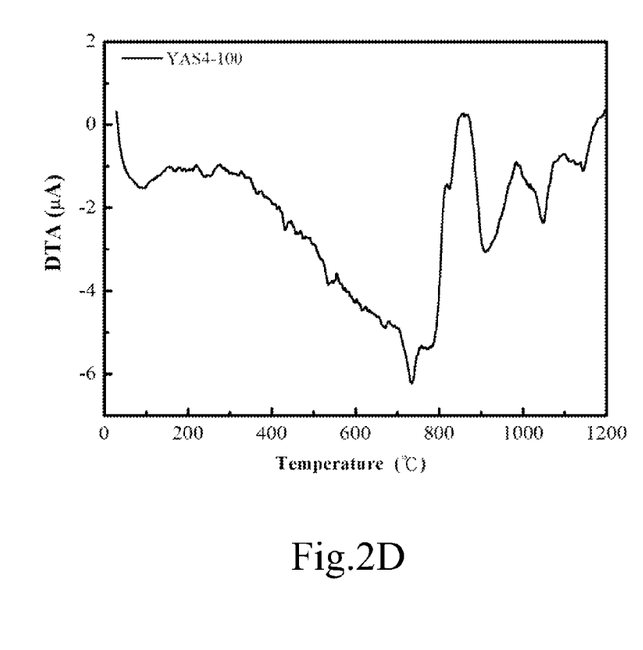
FIG. 2D illustrates the curve of differential thermal analysis of glass for YAS4-100 of the present invention.
Figure 2E:
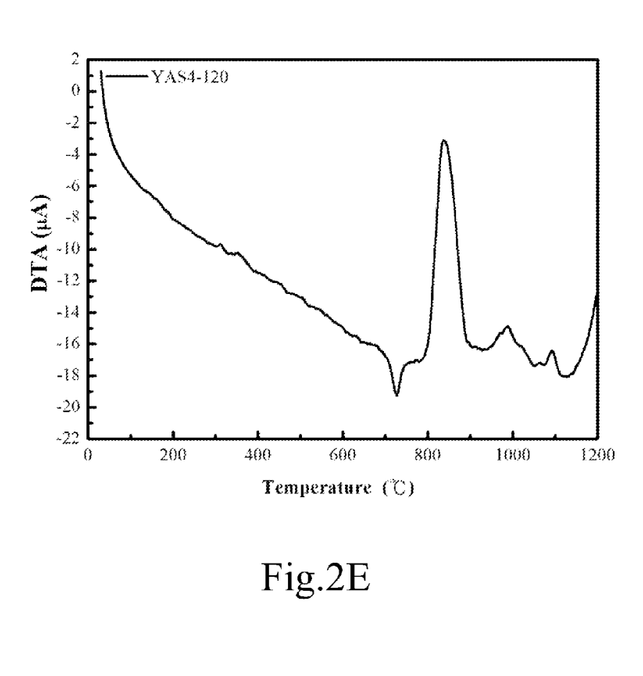
FIG. 2E illustrates the curve of differential thermal analysis of glass for YAS4-120 of the present invention.
Figure 2F:
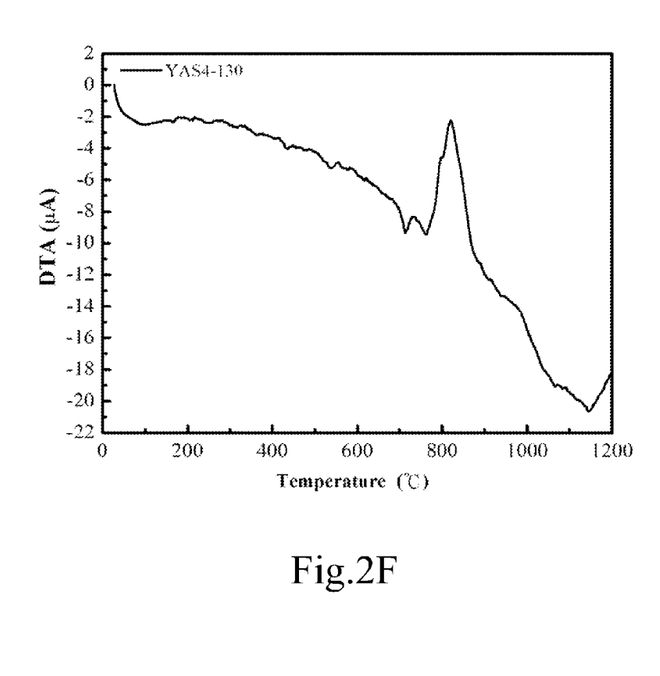
FIG. 2F illustrates the curve of differential thermal analysis of glass for YAS4-130 of the present invention.
Figure 2G:
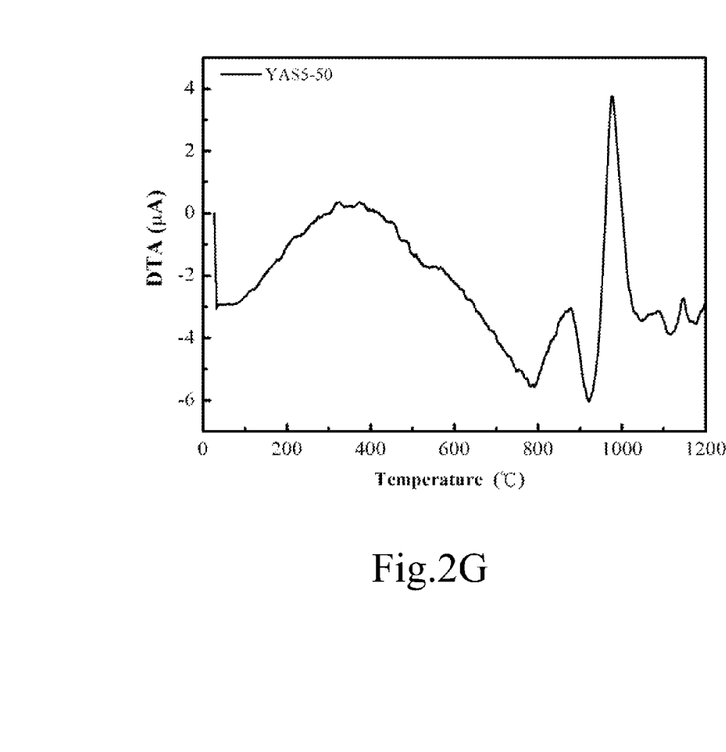
FIG. 2G illustrates the curve of differential thermal analysis of glass for YAS5-50 of the present invention.
Figure 2H:
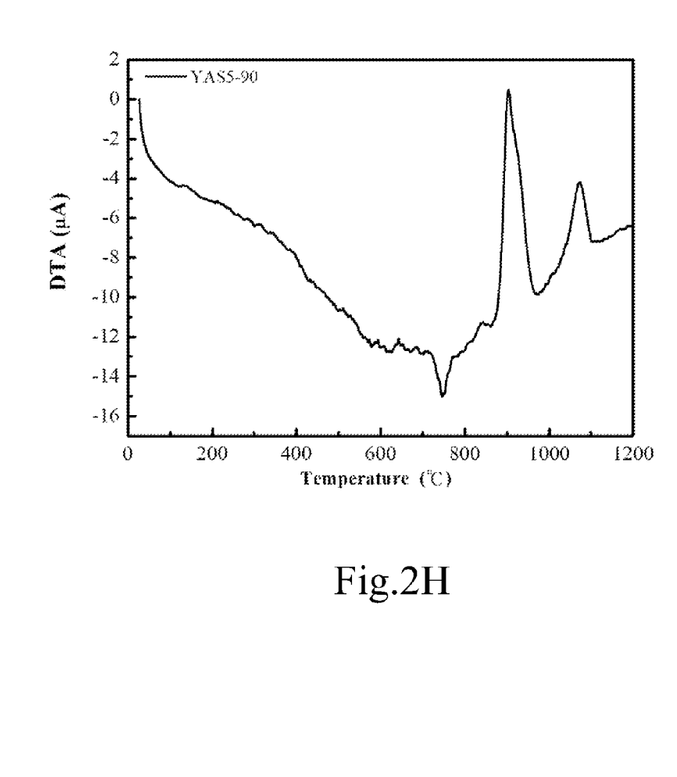
FIG. 2H illustrates the curve of differential thermal analysis of glass for YAS5-90 of the present invention.
Figure 2I:
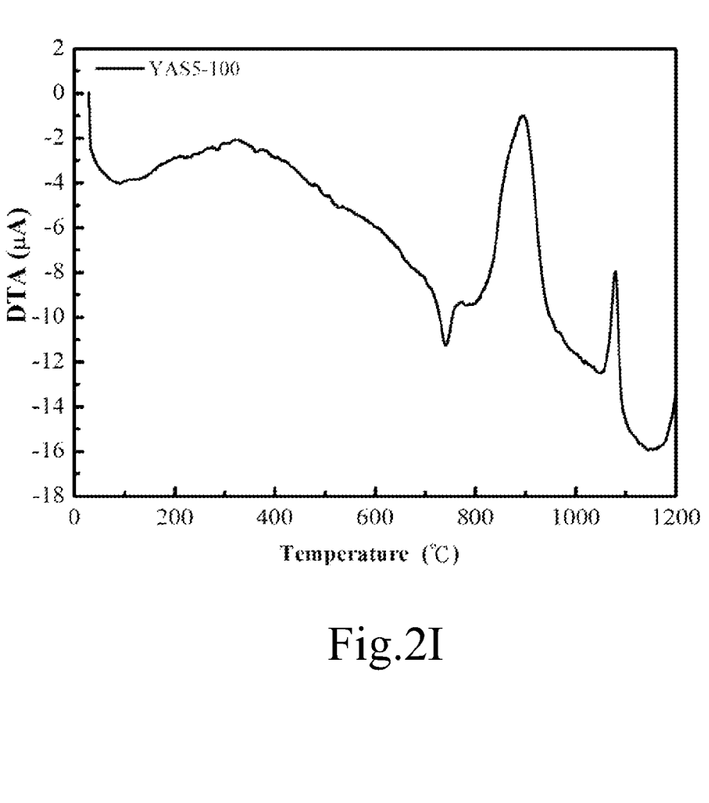
FIG. 2I illustrates the curve of differential thermal analysis of glass for YAS5-100 of the present invention.
Figure 3A:
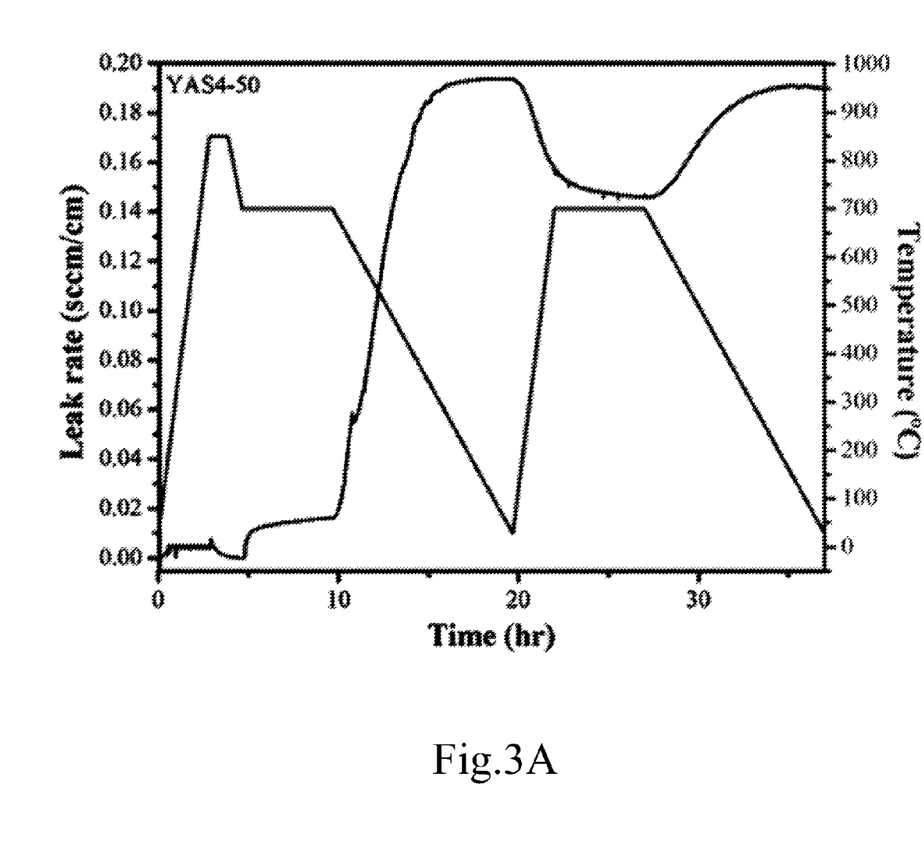
FIG. 3A illustrates relationships of measured leak rates of encapsulated SOFC for YAS4-50 of the present invention.
Figure 3B:
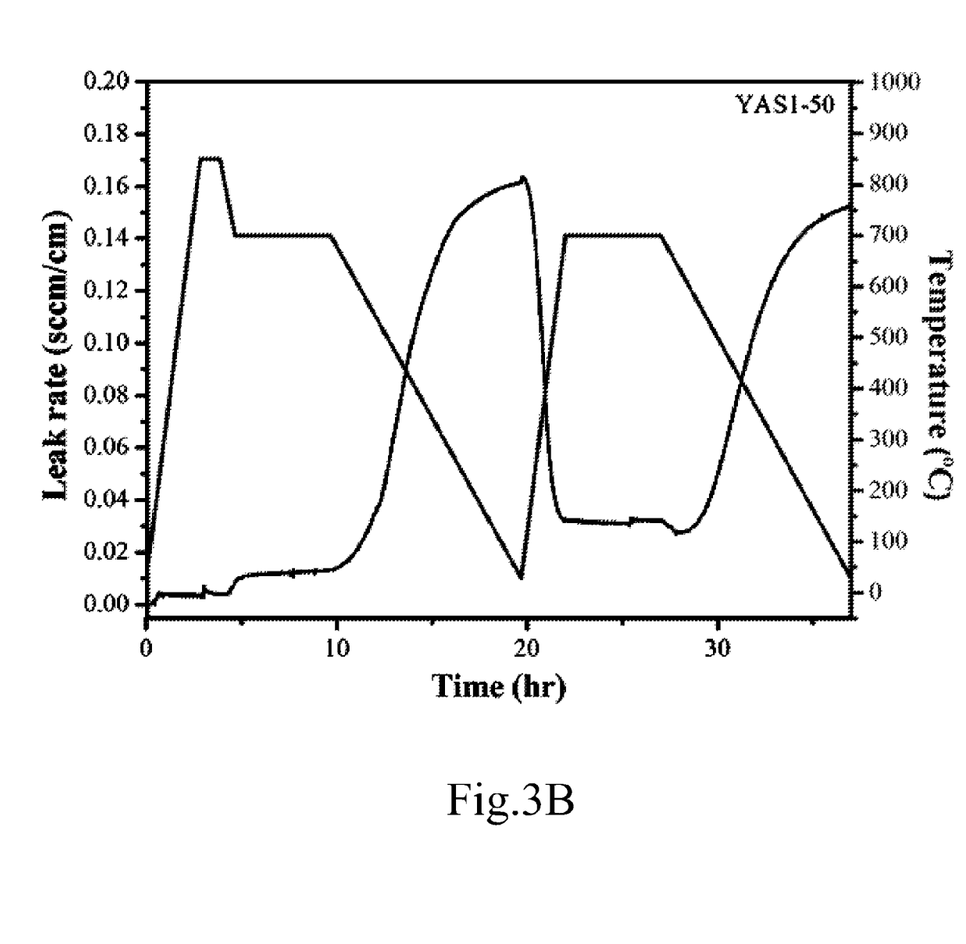
FIG. 3B illustrates relationships of measured leak rates of encapsulated SOFC for YAS1-50 of the present invention.
Figure 3C:
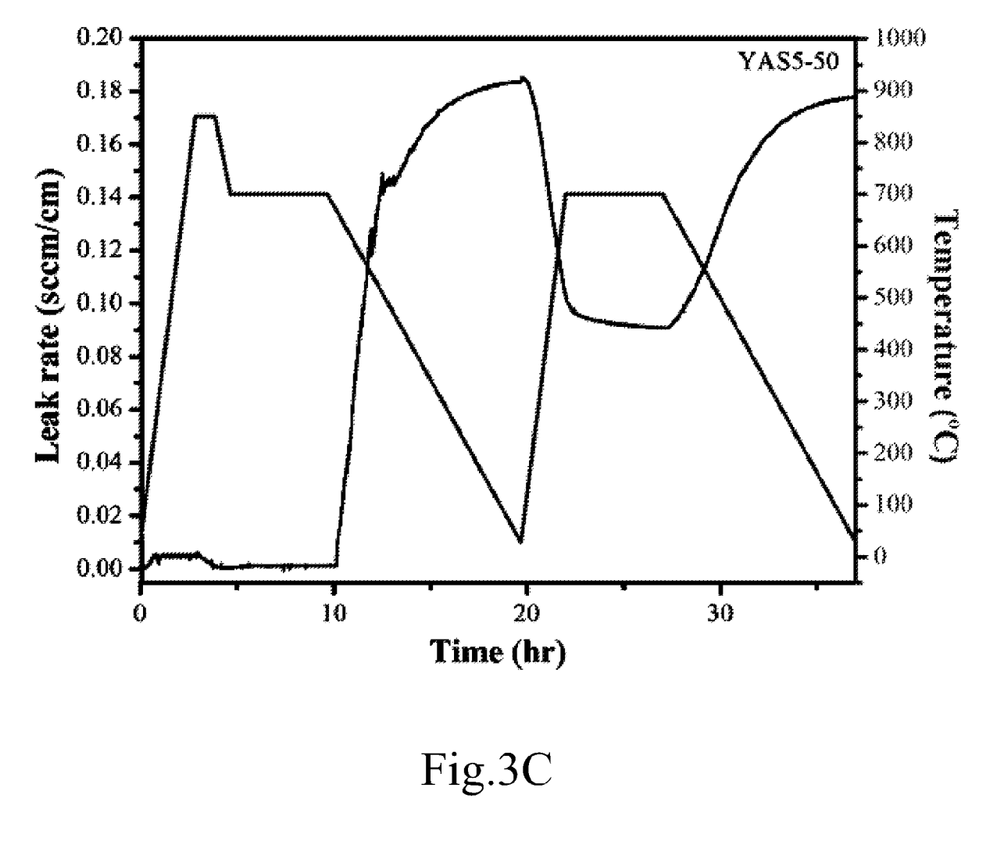
FIG. 3C illustrates relationships of measured leak rates of encapsulated SOFC for YAS5-50 of the present invention.
Figure 3D:
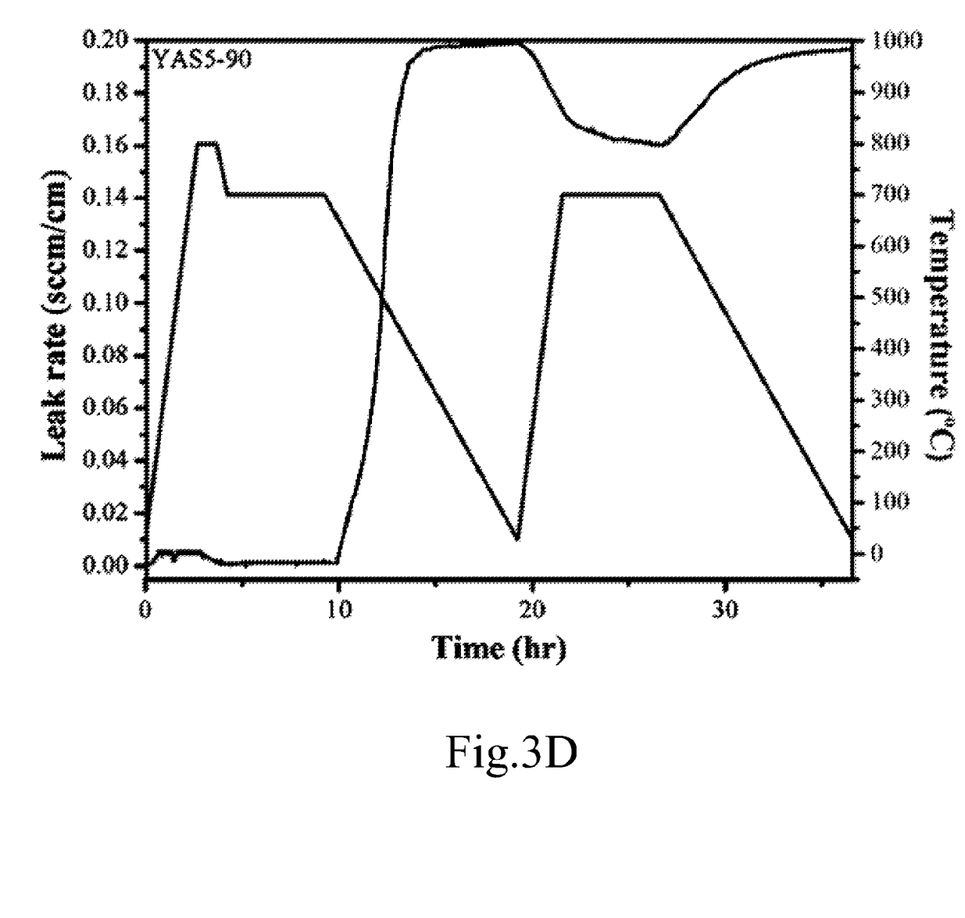
FIG. 3D illustrates relationships of measured leak rates of encapsulated SOFC for YAS5-90 of the present invention.

Referring to FIGS. 1A, 1B and 1C which illustrate curves of thermal expansion coefficients for the present invention, each of which has a turning pointing with a slope abruptly changing at glass transition temperature (T$_g$) ranging from 694° C. to 833° C. as shown in Table 2, wherein FIG. 1A, FIG. 1B, FIG. 1C are the results of curves of thermal expansion coefficients for YAS1-50 and YAS1-25; YAS4-130, YAS4-120, YAS4-100 and YAS4-50; YAS5-100, YAS5-90 and YAS5-50, respectively. It can be seen from Table 2 that glass transition temperature is effectively reduced with zinc oxide (ZnO) added, for instance, the minimum ratio of ZnO and the maximum ratio of ZnO are observed in YAS4-130 and YAS1-25, respectively. The maximum thermal expansion coefficient expressed with a linear slope is observed in YAS1-50. According to ratios of yttrium oxide to silicon dioxide as shown in Table 1, an expansion coefficient is getting bigger as more yttrium oxide is added due to strong capability of yttrium oxide to cut a network structure. Furthermore, an expansion coefficient is further increased with zinc oxide added (FIG. 1).

TABLE 2

|  | Thermal Expansion Coefficient ($\times 10^{-6}$/° C.) | T$_g$ (° C.) | Al$_2$O$_3$/SiO$_2$ | Y$_2$O$_3$/SiO$_2$ | ZnO/SiO$_2$ |
|---|---|---|---|---|---|
| YAS1-50 | 8.06 | 833 | 0.40 | 0.60 | 0.25 |
| YAS1-25 | 8.17 | 797 | 0.40 | 0.60 | 0.50 |
| YAS4-130 | 7.04 | 748 | 0.14 | 0.29 | 0.50 |
| YAS4-120 | 7.51 | 710 | 0.14 | 0.29 | 1.00 |
| YAS4-100 | 7.59 | 699 | 0.14 | 0.29 | 1.20 |
| YAS4-50 | 7.72 | 694 | 0.14 | 0.29 | 1.30 |
| YAS5-100 | 7.01 | 757 | 0.30 | 0.30 | 0.50 |
| YAS5-90 | 7.29 | 717 | 0.30 | 0.30 | 0.90 |
| YAS5-50 | 7.33 | 713 | 0.30 | 0.30 | 1.00 |

Referring to FIG. 2A to 2I which illustrate curves of differential thermal analyses of glass for the present invention wherein an exothermic peak, i.e., crystallization peak of glass, which corresponds to crystallization temperature (Tc) of glass, is detected as temperature increases. FIG. 2A, 2B, 2C, 2D, 2E, 2F, 2G, 2H, 2I are the results of differential thermal analysis on YAS1-25, YAS1-50, YAS4-50, YAS4-100, YAS4-120, YAS4-130, YAS5-50, YAS5-90 and YAS5-100, respectively. According to data summarized in Table 3, crystallization temperature of glass is further lowered with more zinc oxide added. SOFC which features its heat stability affected by crystallization temperature of glass SOFC may lose its original properties and have lowered heat stability when crystallized glass is generated because of glass transition temperature lower than operating temperature of SOFC for a long period.

Referring to FIGS. 3A, 3B, 3C and 3D which illustrate measured leak rates of encapsulated SOFC at 700° C. wherein FIGS. 3A, 3B, 3C and 3D are the results of measured leak rates of encapsulated SOFC on YAS4-50, YAS1-50, YAS5-50 and YAS5-90, respectively. It can be seen from measured leak rates in FIG. 3 that the lowest leak rate is observed in YAS1-50 (thermal expansion coefficient=$8.17 \times 10^{-6}$/° C.) and YAS5-50 (thermal expansion coefficient=$7.01 \times 10^{-6}$/° C.), each of which has a thermal expansion coefficient significantly different from the range of $9 \sim 11 \times 10^{-6}$/° C., thermal expansion coefficient of SOFC in operation. Accordingly, a powder-based glass additive (Bi$_{1.5}$Y$_{0.5}$O$_3$) which has a larger thermal expansion coefficient is compounded into YAS1-50 and YAS5-50, respectively; the present invention is mixed with the glass additive (Bi$_{1.5}$Y$_{0.5}$O$_3$) according to a weight ratio of 1:1.

TABLE 3

|  | T$_c$ (° C.) |
|---|---|
| YAS1-50 | 946 |
| YAS1-25 | 975 |
| YAS4-130 | 822 |
| YAS4-120 | 827 |
| YAS4-100 | 852 |
| YAS4-50 | 926 |
| YAS5-100 | 896 |
| YAS5-90 | 904 |
| YAS5-50 | 977 |

Figure 4:
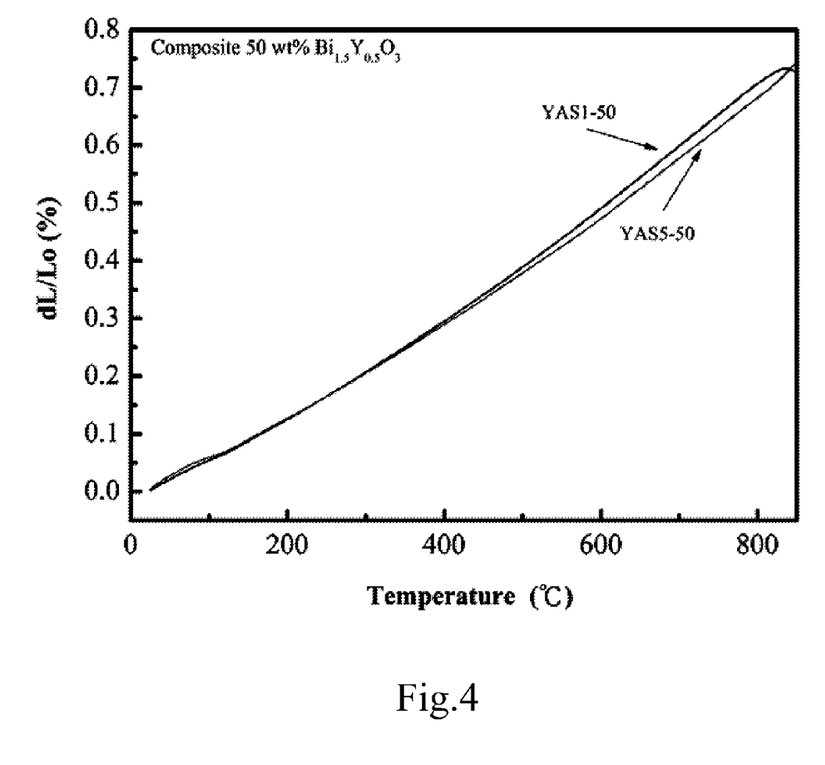
FIG. 4 illustrates curves of thermal expansion coefficients for the present invention with $Bi_{1.5}Y_{0.5}O_3$ added.

Referring to FIG. 4 which illustrates curves of thermal expansion coefficients for the present invention with the glass additive (Bi$_{1.5}$Y$_{0.5}$O$_3$) added wherein thermal expansion coefficients of YAS1-50 and YAS5-50 are increased to $9.47 \times 10^{-6}$/° C. and $9.30 \times 10^{-6}$/° C., respectively. As shown in FIG. 4, the addition of glass additive (Bi$_{1.5}$Y$_{0.5}$O$_3$) contributes to not only increase of a thermal expansion coefficient but also matching between an encapsulating material and other components.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A composite encapsulating material, consisting of silicon dioxide, aluminum oxide, yttrium oxide and zinc oxide.

2. The composite encapsulating material according to claim 1 wherein said composite encapsulating material's glass transition temperature is between 694 and 833° C.

3. The composite encapsulating material according to claim 1, wherein said silicon dioxide and said aluminum oxide accounts for 41.88~62.22 mol % and said yttrium oxide accounts for 10.48~26.67 mol % of the composite encapsulating material.

4. The composite encapsulating material according to claim 2, wherein said aluminum oxide accounts for 5.23~17.78 mol % of the composite encapsulating material.

5. The composite encapsulating material according to claim 1, wherein said aluminum oxide and said silicon dioxide have a molar ratio between 0.14 and 0.40, said yttrium oxide and said silicon dioxide have a molar ratio between 0.29 and 0.60, and said zinc oxide and said silicon dioxide have a molar ratio between 0.25 and 1.30.

6. The composite encapsulating material, consisting of silicon dioxide, aluminum oxide, yttrium oxide, zinc oxide and a glass additive, wherein the glass additive is bismuth yttrium oxide.

7. The composite encapsulating material according to claim 6, wherein said glass additive accounts for about 50 wt % of said composite encapsulating material.

\* \* \* \* \*